Dec. 19, 1933.  W. N. GLAB  1,940,452
DOUBLE POPPET CHECK VALVE
Filed Aug. 13, 1930  2 Sheets—Sheet 1
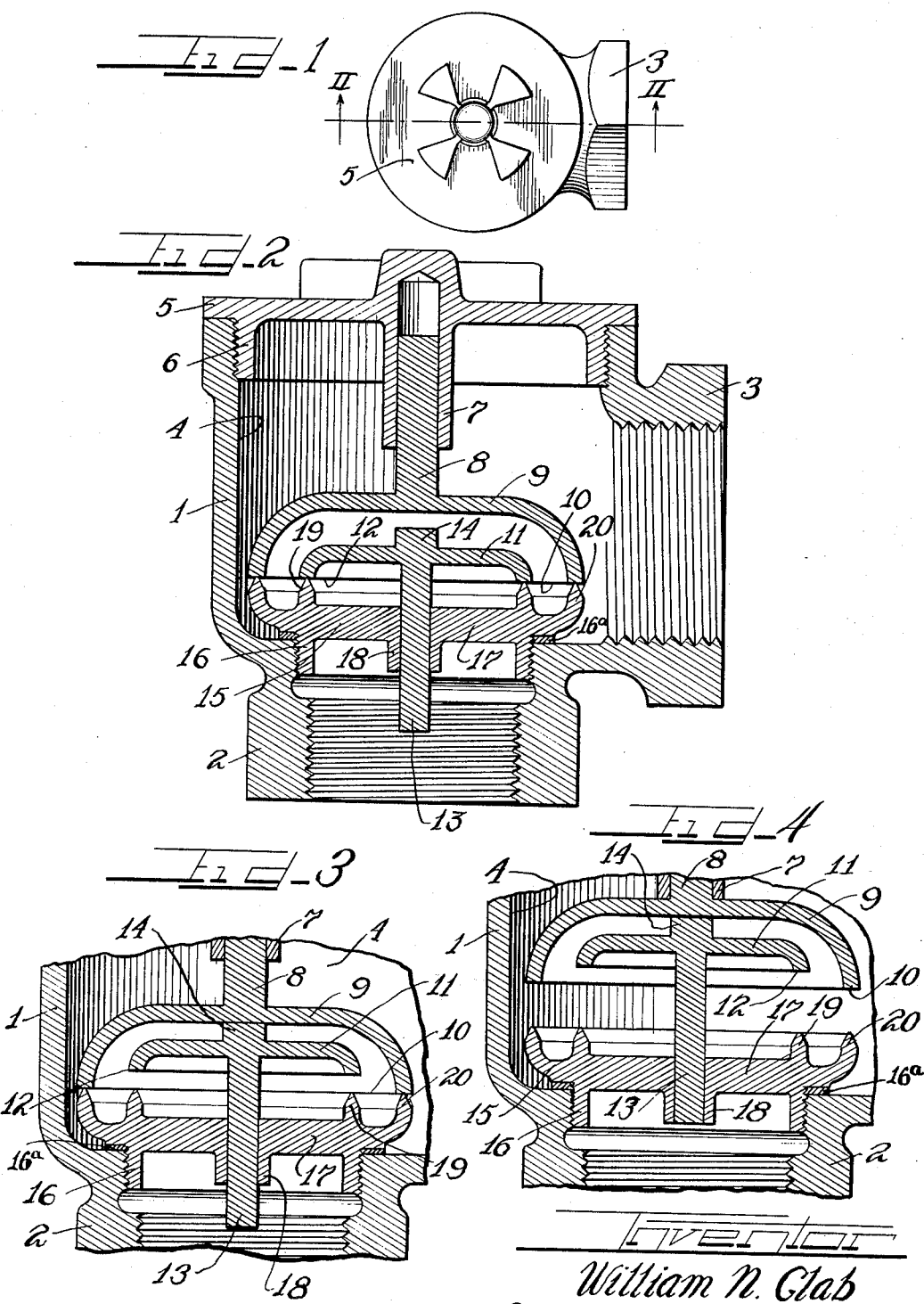
Inventor
William N. Glab
by Charles F. Will Attys Dec. 19, 1933.  W. N. GLAB  1,940,452
DOUBLE POPPET CHECK VALVE
Filed Aug. 13, 1930   2 Sheets-Sheet 2
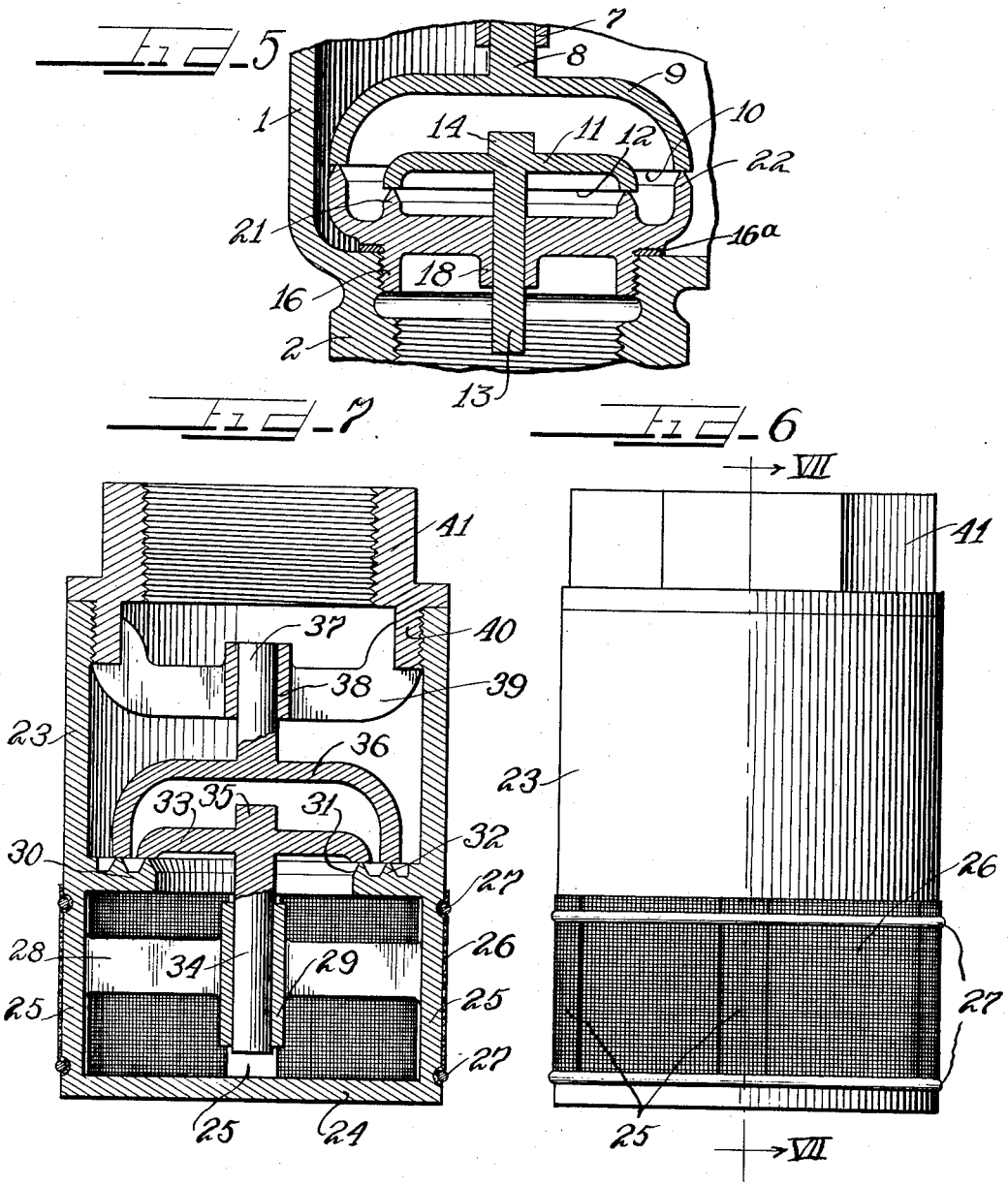
Inventor
William N. Glab
by Charles H. Wills Attys Patented Dec. 19, 1933

1,940,452

UNITED STATES PATENT OFFICE 1,940,452

DOUBLE POPPET CHECK VALVE

William N. Glab, Dubuque, Iowa

Application August 13, 1930. Serial No. 475,081

4 Claims. (Cl. 277—42)

This invention relates to check or lift valves of double poppet construction wherein a valve housing of any desired type of construction, such as an angle valve housing, a T housing or a foot valve housing, has adjustably mounted therein a plurality of poppets or valve members which are so positioned and arranged that they are adapted to rest upon the same or a plurality of valve seats disposed in the same plane or in different planes to afford a valve construction having the advantage of very close seating and holding the liquid in more or less of a film suspension to afford a tighter valve fit.

It is an object of this invention to provide an improved valve of the double poppet type wherein the valve members are aligned to coact with either the same or different valve seats arranged in the same or in different planes.

It is also an object of this invention to provide a check valve construction wherein a plurality of axially aligned valves are mounted for independent operation for coaction with valve seats arranged in either the same or in different planes to permit the valves to afford a double closure in either the same or in different planes, to insure a leak-proof fit.

It is an important object of this invention to provide an improved and simplified form of check valve having one or more valve seats mounted within the valve housing to receive seated thereon a plurality of slidably mounted, coacting poppets or valves to insure a tighter valve fit.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of an improved double poppet check valve embodying the principles of this invention.

Figure 2 is an enlarged vertical longitudinal section of the double poppet check valve, and illustrating the poppets or valves both seated upon the respective valve seats.

Figure 3 is a fragmentary sectional view of the valve mechanism, illustrating the inner or main poppet or valve in open position, with the outer or auxiliary poppet or valve still in contact with its valve seat.

Figure 4 is a similar fragmentary sectional view of the interior of the valve mechanism illustrating both the poppets or valves in open position.

Figure 5 is a fragmentary sectional view similar to that illustrated in Figure 4 but illustrating a modified form of valve construction wherein the valve seats are disposed at different elevations.

Figure 6 is a front elevation of a double poppet foot valve, covering a modified form of the invention.

Figure 7 is a longitudinal vertical section of the foot valve taken on line VII—VII of Figure 6, with parts shown in elevation and illustrating both of the poppets or valves in closed position.

As shown on the drawings:

Figures 1 to 4, inclusive, illustrate one form of the improved device comprising a valve casing or housing 1 of the angle type having an integral intake arm 2 and an outlet arm 3 disposed at right angles with respect to one another and both internally threaded. The valve casing 1 is provided with a valve chamber 4 which opens upwardly through the top of the casing and is closed by means of a closure cap or top plate 5 having integrally formed on the inner surface thereof an externally threaded ring flange 6 which threads into the internally threaded upper end of the housing or casing 1 to close the top thereof. Integrally formed axially on the closure cap or plate 5 is an inwardly directed guide sleeve or tube 7.

Slidably mounted in the guide sleeve 7 is a valve stem 8 which is axially formed integrally upon a secondary or auxiliary valve 9, in the present showing being of concavo-convex or dome shape and having a circular valve edge or surface 10.

Disposed within the valve chamber 4 below the upper or auxiliary valve 9 is a main, primary or lower control valve 11 which is also of concavo-convex or dome shape and is provided with a circular valve edge or surface 12. The main valve 11 is provided with an axial valve stem 13 which is secured axially on the under surface thereof and projects downwardly.

Integrally formed on the top of the main valve 11 and projecting upwardly and axially therefrom is a stop member or boss 14 which, when the main valve is raised, is adapted to contact the inner surface of the upper or secondary valve 9 to hold the two poppet valves 9 and 11 in spaced contacting relation as illustrated in Figures 3 and 4 of the drawings.

The upper or auxiliary poppet valve 9 has the valve stem 8 thereof projecting upwardly, while the main or lower poppet valve 11 has the valve stem 13 thereof projecting downwardly and in axial alignment with the valve stem 8 of the auxiliary poppet valve. The main poppet valve 11 is smaller than the upper or auxiliary poppet valve 9 and is disposed therein so that the valve surfaces 12 and 10 of the poppet valves are concentric.

Mounted within the valve chamber 4 is a valve seat casting 15 of circular form provided with an integral, downwardly directed externally threaded ring flange 16. The ring flange 16 is threaded into the internally threaded upper portion of the valve housing arm 2 and a washer 16ª is provided to insure a water tight connection. The valve seat ring or casting 15 is provided with a diametrically positioned cross bar or bridge piece 17 which supports a guide sleeve 18 axially in alignment with the upper guide sleeve 7. Slidably projecting through the lower guide sleeve 18 is the valve stem 13 of the main poppet valve 11. Integrally formed on the upper surface of the valve casting or ring 15 is a main valve seat 19 which is of circular or ring shape to afford a seat for the reception of the valve surface 12 of the main or lower control poppet valve 11.

Also integrally formed on the valve seat casting or ring 15 is an outer or auxiliary valve seat 20 which is also of circular shape and is concentric with the inner or main valve seat 19. The auxiliary valve seat 20 is positioned to have the circular valve surface 10 of the upper or auxiliary valve 9 seated thereon as illustrated in Figure 2. When the two poppet valves 9 and 11 are in their closed or seated positions seated upon the respective valve seats 20 and 19, a double valve closure arrangement is provided between the valve chamber 4 and the intake arm 2 of the double poppet angle check valve. The two valve seats 19 and 20 are disposed in the same level or plane, and, when the respective poppet valves are seated upon the respective valve seats, a double valve closure is provided, insuring a tighter valve fit. The double poppet valves are axially aligned and are arranged to permit flow through the valve housing in one direction only. In operation, the liquid is permitted to enter the valve housing arm 2 and pass upwardly through the valve casting 15 into contact with the concavo-convex or dome shaped main or lower 11 to raise the same from the position illustrated in Figure 2 into the position illustrated in Figure 3, with the boss 14 seated in contact with the inner face of the upper or auxiliary poppet valve 9. After the lower or main valve 11 has been raised, the continued flow of the liquid acts upon the two poppet valves, thereby causing a continued opening or raising of the main or lower poppet valve and the opening of the upper or auxiliary poppet valve 9 into the open position illustrated in Figure 4, permitting the liquid to flow into the valve chamber 4 and out through the outlet arm 3. Any return flow taking place from the outlet or discharge arm 3 of the valve mechanism will, of course, cause the auxiliary and main poppet valves to move into closed position on their respective valve seats to insure a tight fit and a double check valve seal.

Figure 5 illustrates a modified form of double poppet check valve of a construction substantially the same as that illustrated and described in connection with Figures 1 to 4, inclusive, of the drawings, and like parts are, therefore, designated by similar reference numerals. In the modified form of the device illustrated in Figure 5, the lower or main poppet valve 11 is adapted to seat on an inner or main valve seat 21 which is positioned at a lower elevation than the outer or auxiliary valve seat 22 on which the upper or auxiliary valve 9 is adapted to seat.

Figures 6 and 7 illustrate another modified form of double poppet check valve of the foot type comprising a valve casing or housing 23 of cylindrical form having a bottom closure plate 24 which is integrally connected with the lower end of the casing or housing 23 by means of a plurality of longitudinally disposed, spaced ribs or connecting bars 25, leaving a plurality of separated intake windows disposed circumferentially around the lower part of the valve mechanism. Engaged around the lower portion of the valve mechanism to close the openings or intake windows is a cylindrical screen or sieve 26 which is held in position by means of retaining rings or wire collars 27.

Integrally connecting two of the ribs or bars 25 forming the lower portion of the valve casing or housing is a diametrically disposed bridge piece or beam 28 which supports a valve stem guide sleeve 29 axially within the lower portion of the casing.

Integrally formed within the casing or housing 23 is a valve seat ring or circular flange 30 having integrally formed on the upper surface thereof an inner or main valve seat 31 and an outer or auxiliary valve seat 32. The main and auxiliary valve seats 31 and 32 are concentrically disposed at the same elevaton or in the same plane, but may be arranged in different planes similar to the arrangement illustrated in Figure 5, if desired.

Mounted within the valve chamber of the casing or housing 23 is a lower or main poppet valve 33 provided with a downwardly directed valve stem 34 which slidably projects through the guide sleeve 29. A boss or stop member 35 is formed axially upon the top of the main poppet valve 33 for coaction with the inner face of an upper or auxiliary poppet valve 36 which is mounted for coaction with the outer or auxiliary valve seat 32. The auxiliary poppet valve 36 is provided with an upwardly directed axial valve stem 37 which slidably projects through a guide sleeve 38 which is supported within the valve chamber of the casing 23 by means of a diametrically disposed crosspiece or beam 39 which is integrally formed diametrically across an exteriorly threaded ring flange 40 forming part of an outlet arm or casting 41 connected in the upper end of the valve casing or housing 23.

A liquid passing through the screen 26 is permitted to enter the lower end of the casing or housing 23 through the openings or windows provided between the connecting bars or strips 25, so that the liquid entering the lower intake chamber of the casing 23 is permitted first to act upon the lower or main control poppet valve 33 to raise the same until the boss 35 thereof is brought into contact with the upper or auxiliary poppet valve 36 to cause the same to be moved into open position, allowing the contents of the intake chamber of the valve casing to enter the outlet chamber of the valve casing above the valve seats and escape through the connector or closure cap 41, which is internally threaded for the reception of a threaded pipe or the like.

The double poppet valve construction affords a double check valve seal in which both the poppet valves are adapted to rest upon valve seats which are disposed in either the same plane or in different planes. The double poppet valve arrangement has the advantage of insuring close seating between the poppet valves and the valve seats to insure tighter valve fits.

By arranging the poppet valves to seat upon a single valve seat or upon two valve seats disposed in the same plane, a much smaller valve casting may be used and less machine work is required, thereby reducing the cost of manufacture, in addition to providing a check valve requiring less space. In the improved check valve construction, the friction through the valve is materially reduced, thereby affording a more efficient check valve structure.

It will, of course, be understood that various details of construction may be varied through a wide range without departing from the principles of this invention, and it is, therefore, not purposed to limit the patent granted hereon otherwise than necessitated by the scope of the appended claims.

I claim as my invention:

1. A valve structure comprising a housing, annular seating means in said housing having a central flowway, and a closure therefore including multiple closure parts having concentric seating relation on said means, said parts each being formed adjacent its seating face in such a manner as to deflect liquid toward the cooperating seating surface on said means during movement to seating position.

2. A valve structure comprising a housing, annular seating means in said housing presenting concentric seating areas in a common plane, an inner closure disc having a seating face closing on the inner area and an outer closure disc disposed over the inner disc and having a seating face closing on the outer area, each of said discs having its under surface curved to deflect liquid towards its seating area during the seating operation.

3. A valve structure comprising a housing, annular seating means in said housing, and a pair of superposed discs having their outer margins downwardly deflected to define concentrically disposed seating faces closing on said means, whereby liquid is deflected against the seating means during the seating operation.

4. A valve structure comprising a housing, annular seating means in said housing, a pair of superposed discs having their outer margins downwardly deflected to define concentrically disposed seating faces closing on said means, and means to maintain said discs spaced apart, when in fully unseated position, with the seating face of the lower disc disposed above the seating face of the upper disc.

WILLIAM N. GLAB.